United States Patent
Hoang et al.

(10) Patent No.: US 11,459,426 B2
(45) Date of Patent: Oct. 4, 2022

(54) POLYETHER POLYMER COMPOSITION, METHOD FOR PRODUCING SAME, AND SHEET IN WHICH SAME IS USED

(71) Applicant: ZEON CORPORATION, Tokyo (JP)

(72) Inventors: The Ban Hoang, Tokyo (JP); Manabu Sugiyama, Tokyo (JP); Shigetaka Hayano, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 638 days.

(21) Appl. No.: 16/463,469

(22) PCT Filed: Nov. 29, 2017

(86) PCT No.: PCT/JP2017/042762
§ 371 (c)(1),
(2) Date: May 23, 2019

(87) PCT Pub. No.: WO2018/101310
PCT Pub. Date: Jun. 7, 2018

(65) Prior Publication Data
US 2019/0276601 A1 Sep. 12, 2019

(30) Foreign Application Priority Data
Nov. 30, 2016 (JP) .............................. JP2016-232326

(51) Int. Cl.
| | | |
|---|---|---|
| C08G 65/333 | (2006.01) | |
| C08G 65/26 | (2006.01) | |
| C08J 3/20 | (2006.01) | |
| C08J 5/18 | (2006.01) | |
| C08K 3/08 | (2006.01) | |
| C08K 3/22 | (2006.01) | |
| C08L 71/02 | (2006.01) | |
| C08K 3/28 | (2006.01) | |
| C08K 3/20 | (2006.01) | |

(52) U.S. Cl.
CPC ... *C08G 65/33317* (2013.01); *C08G 65/2624* (2013.01); *C08G 65/333* (2013.01); *C08J 3/203* (2013.01); *C08J 5/18* (2013.01); *C08K 3/08* (2013.01); *C08K 3/20* (2013.01); *C08K 3/22* (2013.01); *C08K 3/28* (2013.01); *C08L 71/02* (2013.01); *C08J 2371/02* (2013.01); *C08K 2003/085* (2013.01); *C08K 2003/0806* (2013.01); *C08K 2003/2296* (2013.01)

(58) Field of Classification Search
CPC .......... C08J 3/203; C08J 5/18; C08J 2371/02; C08L 71/03; C08L 71/02; C08G 65/33317; C08G 65/333; C08G 65/24; C08G 65/2624; C08K 3/08; C08K 3/22; C08K 3/20; C08K 3/28; C08K 2003/2296; C08K 2003/085; C08K 2003/0806

See application file for complete search history.

(56) References Cited

U.S. PATENT DOCUMENTS

| | | |
|---|---|---|
| 2005/0116376 A1 | 6/2005 | Egami et al. |
| 2009/0305111 A1 | 12/2009 | Arai et al. |
| 2010/0219551 A1 | 9/2010 | Arai et al. |
| 2013/0214209 A1* | 8/2013 | Hayano .............. G03G 15/0233 252/500 |

FOREIGN PATENT DOCUMENTS

| | | |
|---|---|---|
| JP | 2004-061639 A | 2/2004 |
| JP | 2005-353585 A | 12/2005 |
| JP | 5434795 B2 | 3/2014 |
| JP | 2014-070137 A | 4/2014 |
| JP | 5839573 B2 | 1/2016 |
| WO | 2003/078528 A1 | 9/2003 |
| WO | 2011/125636 A1 | 10/2011 |

OTHER PUBLICATIONS

English machine translation of JP 2014-070137 (Year: 2014).*
Jan. 30, 2018 International Search Report issued in International Patent Application No. PCT/JP2017/042762.
Jun. 5, 2020 Search Report issued in European Patent Application No. 17876528.5.
Jun. 4, 2019 International Preliminary Report on Patentability issued in International Patent Application No. PCT/JP2017/042762.
Nov. 26, 2021 Office Action issued in European Patent Application No. 17876528.5.

* cited by examiner

*Primary Examiner* — Angela C Scott
(74) *Attorney, Agent, or Firm* — Oliff PLC

(57) ABSTRACT

A polyether polymer composition containing 200 parts by weight or more of a metal-containing powder per a total of 100 parts by weight of a cationic group-containing low molecular weight polyether polymer composed of 10 to 200 oxirane monomer units, wherein at least a part of the oxirane monomer units is an oxirane monomer unit having a cationic group, and a high molecular weight polyether polymer composed of more than 200 oxirane monomer units is provided.

9 Claims, No Drawings

POLYETHER POLYMER COMPOSITION, METHOD FOR PRODUCING SAME, AND SHEET IN WHICH SAME IS USED

TECHNICAL FIELD

The present invention relates to a polyether polymer composition that is capable of appropriately showing various properties of a metal-containing powder such as high heat conductivity and high electrical conductivity, that also has excellent long-term stability, and that can also be suitably processed into a sheet, and relates to a method for producing such a polyether polymer composition and to a sheet containing such a polyether polymer composition.

BACKGROUND ART

With a reduction in size and an increase in output power of a heat-generating electronic component such as a semiconductor device, an amount of heat per unit area generated from the electronic component has been becoming extremely large. In contrast, the heat-generating electronic component such as a semiconductor device needs to be cooled because its temperature increase causes a performance deterioration. The heat-generating electronic component is cooled by, for example, providing a cooling member such as a heat sink made of metal in a vicinity of such a heat-generating electronic component. However, there has been a problem in that a bad contact between the heat-generating electronic component and the cooling member such as a heat sink allows air to intervene in a contact portion and causes a decrease in cooling efficiency. To solve this problem, a method to bring them in contact with each other through a heat conductive material has been conventionally employed to efficiently transfer heat from the heat-generating electronic component to the cooling member such as a heat sink. When the heat conductive polymer material is used, the heat conductive polymer material intervenes at an interface of the contact portion instead of the air, which allows an efficient heat transfer and consequently improves cooling efficiency.

As such a heat conductive polymer material, besides a heat conductive sheet composed of a hardened material produced by filling a silicone rubber and the like with a heat conductive filler, a heat conductive adhesive, which has flexibility and can be hardened by cross-linking, produced by filling a silicone compound having liquidity with a heat conductive filler, and also a heat conductive grease having liquidity produced by filling a liquid material such as liquid silicone with a heat conductive filler are used, for example (see Patent Document 1, for example). All these materials are produced by filling a rubber material or a liquid material as a matrix with a heat conductive filler.

In the meanwhile, as a semiconductor used for a highly integrated machine such as a supercomputer and a server recently has more and more functions, an amount of heat generated during an operation has been becoming larger and larger. For that reason, the heat conductive sheet and the heat conductive grease used for the semiconductor are expected to have better heat dissipating performance. As a method for improving the heat dissipating performance of the heat conductive sheet and the heat conductive grease, a method for improving their heat conductivity has been commonly used. However, there has been a problem in that when a polymer is filled with a large amount of the heat conductive filler to improve the heat conductivity, the heat conductive filler in the heat conductive sheet or the heat conductive grease shows poor dispersibility in some cases, and also, even when the heat conductive filler shows good dispersibility at the beginning of use, the heat conductive filler is agglomerated after long-term use and thus fails to show sufficient heat-transfer performance.

Besides the above, there has been a demand for a fine and flexible electrical wiring and electrical circuit in the field of electronic materials, and therefore a technique for printing an electrical circuit using an ink-jet printing system or the like has been studied to meet such a demand for fine and flexible products. Especially, if an electrically conductive paste or an electrically conductive ink can be printed on a surface of a target material using the ink-jet printing system or the like, a continuous printing of very fine wires for forming fine patterns becomes possible. With such a method that forms fine patterns, a production cost can be reduced significantly as compared to that of a conventional method that requires a material to undergo an etching process and a photolithography process.

As the electrically conductive paste and the electrically conductive ink which are expected to be used in the ink-jet printing system, a composition containing a polymer such as an epoxy resin and an electrically conductive filler such as a silver powder is generally used (see Patent Document 2, for example). Further, a form of the electrical circuit is fixed by thermally hardening an epoxy moiety after printing or when metal particles are melted at a time of thermally hardening, the composition is self-organized to form a metal joint portion and a thermosetting resin serves to strengthen around that portion in some cases.

Such an electrically conductive paste and an electrically conductive ink are expected to achieve high electrical conductivity even if their use in the ink-jet printing system or the like leads to a further advance in technology to produce more fine patterns. However, there has been the following problem: when a polymer is filled with a large amount of the electrically conductive filler to improve electrical conductivity, the electrically conductive filler in the electrically conductive paste or the electrically conductive ink shows poor dispersibility in some cases, and also, even when the electrically conductive filler shows good dispersibility at the beginning of use, the electrically conductive filler is agglomerated after log-term use and thus fails to show sufficient electrical conductive performance. Such a problem has occurred similarly in a conductive sheet used for various applications that require electrical conductivity.

RELATED ART

Patent Documents

Patent Document 1: Japanese Patent No. 5434795
Patent Document 2: Japanese Patent No. 5839573

SUMMARY OF THE INVENTION

Problem to be Solved by the Invention

The present invention was completed in view of the situation as described above. An object of the present invention is to provide a polyether polymer composition that is capable of appropriately showing various properties of a metal-containing powder such as high heat conductivity and high electrical conductivity, that also has excellent long-term stability, and that can also be suitably processed into a sheet, and to provide a method for producing such a polyether polymer composition and a sheet containing such a polyether polymer composition.

Means for Solving the Problem

The present inventors made an extensive study to achieve the above object. The present inventors consequently found out that a composition produced by compounding a certain amount of a metal-containing powder in a cationic group-containing low molecular weight polyether polymer composed of 10 to 200 oxirane monomer units, wherein at least a part of the oxirane monomer units is an oxirane monomer unit having a cationic group, and a high molecular weight polyether polymer composed of more than 200 oxirane monomer units, is capable of appropriately showing various properties of the metal-containing powder such as high heat conductivity and high electrical conductivity, and further, the composition is capable of effectively preventing agglomeration of the metal-containing powder even after a lapse of long time, has excellent long-term stability, and can also be suitably processed into a sheet. The present invention was completed based on the above findings.

That is, the present invention provides a polyether polymer composition containing 200 parts by weight or more of a metal-containing powder per a total of 100 parts by weight of a cationic group-containing low molecular weight polyether polymer composed of 10 to 200 oxirane monomer units, wherein at least a part of the oxirane monomer units is an oxirane monomer unit having a cationic group, and a high molecular weight polyether polymer composed of more than 200 oxirane monomer units.

In the polyether polymer composition of the present invention, the metal-containing powder is preferably at least one selected from a metal powder, a metal oxide powder, and a metal nitride powder, and more preferably a metal oxide powder and a metal powder.

In the cationic group-containing low molecular weight polyether polymer, a proportion of the oxirane monomer unit having a cationic group is preferably 5 mol % or more based on all oxirane monomer units of the cationic group-containing low molecular weight polyether polymer.

In the polyether polymer composition of the present invention, the cationic group-containing low molecular weight polyether polymer is preferably composed of a monomer unit represented by the following general formula (1):

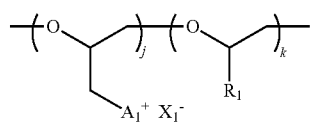

wherein $A_1^+$ represents a cationic group or a cationic group-containing group, $X_1^-$ represents any counter anion, $R_1$ represents a non-ionic group, j is an integer of 1 or more, k is an integer of 0 or more, and j and k satisfy $10 \leq j+k \leq 200$.

In the polyether polymer composition of the present invention, at least a part of the oxirane monomer units contained in the high molecular weight polyether polymer is preferably an oxirane monomer unit having a cationic group.

In the polyether polymer composition of the present invention, the high molecular weight polyether polymer is preferably composed of a monomer unit represented by the following general formula (2):

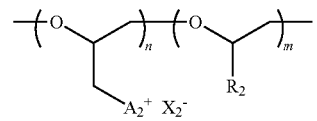

wherein $A_2^+$ represents a cationic group or a cationic group-containing group, $X_2^-$ represents any counter anion, $R_2$ represents a non-ionic group, n is an integer of 0 or more, m is an integer of 0 or more, and n and m satisfy $n+m>200$.

In the polyether polymer composition of the present invention, a ratio between the cationic group-containing low molecular weight polyether polymer and the high molecular weight polyether polymer is preferably 20:1 to 1:20 in terms of a weight ratio of "cationic group-containing low molecular weight polyether polymer:high molecular weight polyether polymer".

Further, the present invention also provides a sheet containing the above-mentioned polyether polymer composition of the present invention.

In addition, the present invention provides a method for producing a polyether polymer composition, the method including, while applying a shear force, mixing under substantially solvent-free conditions a cationic group-containing low molecular weight polyether polymer composed of 10 to 200 oxirane monomer units, wherein at least a part of the oxirane monomer units is an oxirane monomer unit having a cationic group, a high molecular weight polyether polymer composed of more than 200 oxirane monomer units, and a metal-containing powder.

Effects of Invention

The present invention can provide a polyether polymer composition that is capable of appropriately showing various properties of a metal-containing powder such as high heat conductivity and high electrical conductivity, that also has excellent long-term stability, and that can also be suitably processed into a sheet. Further, the present invention can also provide a method for producing such a polyether polymer composition, and a sheet containing such a polyether polymer composition.

DESCRIPTION OF EMBODIMENTS

The polyether polymer composition of the present invention containing 200 parts by weight or more of a metal-containing powder per a total of 100 parts by weight of a cationic group-containing low molecular weight polyether polymer composed of 10 to 200 oxirane monomer units, wherein at least a part of the oxirane monomer units is an oxirane monomer unit having a cationic group, and a high molecular weight polyether polymer composed of more than 200 oxirane monomer units.

According to the present invention, by using such a cationic group-containing low molecular weight polyether polymer and a high molecular weight polyether polymer in combination, compatibility with the metal-containing powder can be enhanced by the action of the cationic group-containing low molecular weight polyether polymer, and furthermore, the obtained polyether polymer composition can be suitably processed into a sheet by the action of the high molecular weight polyether polymer. As a result, a polyether polymer composition can be provided that, while being capable of appropriately showing various properties of a metal-containing powder such as high heat conductivity and high electrical conductivity, also has excellent long-term stability, and that can also be suitably processed into a sheet.

<Cationic Group-Containing Low Molecular Weight Polyether Polymer>

The cationic group-containing low molecular weight polyether polymer composing the polyether polymer composition of the present invention is a polymer composed of an oxirane monomer unit which is a unit obtained by ring-opening polymerization of an oxirane structure part of a compound containing an oxirane structure, and having 10 to 200 oxirane monomer units, wherein at least a part of the oxirane monomer units is an oxirane monomer unit having a cationic group. The cationic group-containing low molecular weight polyether polymer shows high interaction with the surface/interface of the metal-containing powder, and as a result shows high compatibility with the metal-containing powder. Due to this high compatibility, in the polyether polymer composition of the present invention, an action of improving the high dispersibility and the long-term stability of the metal-containing powder is shown. In addition, the cationic group-containing low molecular weight polyether polymer shows an action of promoting micro dispersion during the production process as a result of its high interaction with the surface/interface of the metal-containing powder.

Specific examples of the oxirane monomer unit include an alkylene oxide unit such as an ethylene oxide unit, a propylene oxide unit, and 1,2-butylene oxide unit; an epihalohydrin unit such as an epichlorohydrin unit, an epibromohydrin unit, and an epiiodohydrin unit; an alkenyl group-containing oxirane monomer unit such as an allyl glycidyl ether unit; an aromatic ether group-containing oxirane monomer unit such as a phenyl glycidyl ether unit; a (meth)acryloyl group-containing oxirane monomer unit such as a glycidyl acrylate unit and a glycidyl methacrylate unit; and the like. However, the oxirane monomer unit is not limited to these examples.

The cationic group-containing low molecular weight polyether polymer used in the present invention may have two or more oxirane monomer units. A distribution pattern of those repeating units is not limited to a particular pattern in this case, and a random distribution is preferred.

The cationic group-containing low molecular weight polyether polymer used in the present invention contains an oxirane monomer unit having a cationic group as at least a part of oxirane monomer units. Due to the action of such a cationic group and its relatively low molecular weight, a high interaction with the surface/interface of the metal-containing powder is shown, and as a result, high compatibility with the metal-containing powder is shown. Therefore, according to the present invention, by including the cationic group-containing low molecular weight polyether polymer, it is possible to more appropriately prevent the agglomeration of the metal-containing powder after a lapse of long time, and as a result the polyether polymer composition of the present invention can have better long-term stability.

The cationic group which can be included in the cationic group-containing low molecular weight polyether polymer is not limited to a particular cationic group. From the viewpoint of the cationic group which is capable of further enhancing the compatibility with the metal-containing powder in the polyether polymer composition, and as a result more appropriately enhancing an effect of preventing the agglomeration of the metal-containing powder after a lapse of long time, the cationic group is preferably a cationic group in which atoms from group 15 or 16 of the periodic table have formed an onium cation structure, more preferably a cationic group in which nitrogen atoms have formed an onium cation structure, further preferably a cationic group in which nitrogen atoms in a nitrogen atom-containing aromatic heterocycle have formed an onium cation structure, particularly preferably a cationic group in which nitrogen atoms in an imidazolium ring have formed an onium cation structure.

Specific examples of the cationic group include an ammonium group such as an ammonium group, a methylammonium group, a butylammonium group, a cyclohexyl ammonium group, an anilinium group, a benzylammonium group, an ethanolammonium group, a dimethylammonium group, a diethylammonium group, a dibutylammonium group, a nonylphenylammonium group, a trimethylammonium group, a triethylammonium group, a n-butyldimethylammonium group, a n-octyldimethylammonium group, a n-stearyldimethylammonium group, a tributylammonium group, a trivinylammonium group, a triethanolammonium group, an N,N-dimethylethanolammonium group, and a tri(2-ethoxyethyl) ammonium group; a group containing a heterocyclic ring having a cationic nitrogen atom such as a piperidinium group, a 1-pyrrolidinium group, an imidazolium group, a 1-methylimidazolium group, a 1-ethylimidazolium group, a benzimidazolium group, a pyrrolium group, a 1-methylpyrrolium group, an oxazolium group, a benzoxazolium group, a benzisoxazolium group, a pyrazolium group, an isoxazolium group, a pyridinium group, a 2,6-dimethylpyridinium group, a pyrazinium group, a pyrimidinium group, a pyridazinium group, a triazinium group, an N,N-dimethylanilinium group, a quinolinium group, an isoquinolinium group, an indolinium group, an isoindolium group, a quinoxalium group, an isoquinoxalium group, and a thiazolium group; a group having a cationic phosphorus atom such as a triphenylphosphonium salt and a tributylphosphonium group; and the like. However, it is not limited to these examples. Among these examples, a group containing a heterocyclic ring having a cationic nitrogen atom such as an imidazolium group, a 1-methylimidazolium group, a 1-ethylimidazolium group, and a benzimidazolium group is preferred.

The cationic group generally has a counter anion, the counter anion is not limited to a particular one, and examples thereof include a halide ion such as $Cl^-$, $Br^-$, and $I^-$, a sulfonylimide ion such as $(FSO_2)_2N^-$, $(CF_3SO_2)_2N^-$, and $(CF_3CF_2SO_2)_2N^-$, and further, $OH^-$, $SCN^-$, $BF_4^-$, $PF_6^-$, $ClO_4^-$, $CH_3SO_3^-$, $CF_3SO_3^-$, $CF_3COO^-$, $PhCOO^-$, and the like. These counter anions may be appropriately selected according to properties of a polyether polymer composition to be produced.

For the cationic group-containing low molecular weight polyether polymer used in the present invention, among oxirane monomer units composing the cationic group-containing low molecular weight polyether polymer, at least a part of the oxirane monomer units may be an oxirane monomer unit having a cationic group and, for example, the oxirane monomer units composing the cationic group-containing low molecular weight polyether polymer may all have a cationic group or may be a mix of the oxirane monomer units having a cationic group and the oxirane monomer units not having a cationic group. In the cationic group-containing low molecular weight polyether polymer used in the present invention, a proportion of oxirane monomer units having a cationic group is not particularly limited, and is preferably 5 mol % or more, more preferably 20 mol % or more, further preferably 50 mol % or more, and particularly preferably 80 mol % or more, based on all oxirane monomer units of the cationic group-containing low molecular weight polyether polymer. An upper limit of the proportion of the oxirane monomer units having a cationic group is not particularly limited, and is preferably 100 mol %.

Here, in the present invention, the oxirane monomer unit having a cationic group mainly shows an action of enhancing compatibility with the metal-containing powder. According to the present invention, as such a polyether polymer having a cationic group, a low molecular weight polyether polymer composed of 10 to 200 oxirane monomer units is used. Therefore, for example, when compared with a polyether polymer having a relatively high molecular weight, the content rate of the cationic group can be set to be relatively high. As a result, according to the present invention, by using such a cationic group-containing low molecular weight polyether polymer, compatibility with the metal-containing powder can be more appropriately enhanced.

The structure of the cationic group-containing low molecular weight polyether polymer used in the present invention is not particularly limited. However, a structure composed of a monomer unit represented by the following general formula (1) is preferred.

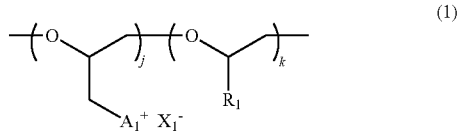

(1)

wherein $A_1^+$ represents a cationic group or a cationic group-containing group, $X_1^-$ represents any counter anion, $R_1$ represents a non-ionic group, j is an integer of 1 or more, k is an integer of 0 or more, and j and k satisfy $10 \leq j+k \leq 200$.

In the above general formula (1), $A_1^+$ represents a cationic group or a cationic group-containing group. Specific examples of the cationic group are as described above, and specific examples of the cationic group-containing group include a group containing the cationic group as described above.

In the above general formula (1), $X_1^-$ represents any counter anion. Specific examples of the counter anion are as described above.

In the above general formula (1), $R_1$ represents a non-ionic group and is not limited to a particular group as long as it is a non-ionic group. Examples thereof include a hydrogen atom; an alkyl group having 1 to 10 carbon atoms such as a methyl group, an ethyl group, a n-propyl group, an isopropyl group, a n-butyl group, an isobutyl group, and a t-butyl group; an alkenyl group having 2 to 10 carbon atoms such as a vinyl group, an allyl group, and a propenyl group; an alkynyl group having 2 to 10 carbon atoms such as an ethynyl group and a propynyl group; a cycloalkyl group having 3 to 20 carbon atoms such as a cyclopropyl group, a cyclobutyl group, a cyclopentyl group, and a cyclohexyl group; an aryl group having 6 to 20 carbon atoms such as a phenyl group, a 1-naphthyl group, and a 2-naphthyl group; and the like.

Among these examples, an alkyl group having 1 to 10 carbon atoms, an alkenyl group having 2 to 10 carbon atoms, an alkynyl group having 2 to 10 carbon atoms, a cycloalkyl group having 3 to 20 carbon atoms, and an aryl group having 6 to 20 carbon atoms may have a substituent at any position.

Examples of the substituent include an alkyl group having 1 to 6 carbon atoms such as a methyl group and an ethyl group; an alkoxy group having 1 to 6 carbon atoms such as a methoxy group, an ethoxy group, and an isopropoxy group; an alkenyloxy group having 2 to 6 carbon atoms such as a vinyloxy group and an allyloxy group; an aryl group which may have a substituent such as a phenyl group, a 4-methylphenyl group, a 2-chlorophenyl group, and a 3-methoxyphenyl group; a halogen atom such as a fluorine atom, a chlorine atom, and a bromine atom; an alkylcarbonyl group having 1 to 6 carbon atoms such as a methylcarbonyl group and an ethylcarbonyl group; a (meth)acryloyloxy group such as an acryloyloxy group and a methacryloyloxy group; and the like.

In the general formula (1), j may be an integer of 1 or more, k may be an integer of 0 or more, and j and k may satisfy $10 \leq j+k \leq 200$. However, j is preferably an integer of 10 to 200, more preferably an integer of 20 to 200, further preferably an integer of 30 to 200, and particularly preferably an integer of 50 to 200. k is preferably an integer of 0 to 199, more preferably an integer of 0 to 190, further preferably an integer of 0 to 100, and particularly preferably k=0. In addition, j+k is an integer of 10 to 200, preferably an integer of 20 to 200, more preferably an integer of 30 to 200, and further preferably an integer of 50 to 200.

When the structure of the cationic group-containing low molecular weight polyether polymer is composed of the monomer unit represented by the above general formula (1), a polymer chain end is not limited to a particular group, and may be any group. Examples of the polymer chain end group include the above-described cationic groups, a hydroxy group, a hydrogen atom, and the like.

The cationic group-containing low molecular weight polyether polymer used in the present invention is composed of 10 to 200 oxirane monomer units, preferably 20 to 200 oxirane monomer units, more preferably 30 to 200 oxirane monomer units, and further preferably 50 to 200 oxirane monomer units. By using a cationic group-containing low molecular weight polyether polymer having 10 to 200 oxirane monomer units, a high interaction with the surface/interface of the metal-containing powder is shown. As a result, a high compatibility with the metal-containing powder can be shown, and the high dispersibility and long-term stability of the metal-containing powder in the polyether polymer composition of the present invention can be improved. On the other hand, when the number of oxirane monomer units composing the cationic group-containing low molecular weight polyether polymer is too small, the dispersibility of the metal-containing powder in the obtained composition deteriorates, the long-term stability deteriorates, the plastic effect in the obtained composition is increased, and the mechanical strength and ductility deteriorate. The number of oxirane monomer units of the cationic group-containing low molecular weight polyether polymer can be determined by a method described in EXAMPLES below.

The cationic group-containing low molecular weight polyether polymer used in the present invention may be composed of 10 to 200 oxirane monomer units. A number average molecular weight (Mn) of the cationic group-containing low molecular weight polyether polymer used in the present invention is not limited to a particular value. It is preferably 500 to 100,000, more preferably 750 to 90,000, and particularly preferably 1,000 to 80,000. Further, a molecular weight distribution (Mw/Mn) represented by the ratio of the weight average molecular weight (Mw) to the number average molecular weight (Mn) is preferably 1.0 to 2.0, and more preferably 1.0 to 1.5. The number average molecular weight and the molecular weight distribution of the cationic group-containing low molecular weight polyether polymer can be determined by a method described in EXAMPLES below.

A chain structure of the cationic group-containing low molecular weight polyether polymer used in the present invention is not limited to a particular structure and may be a straight chain or a chain structure having a branch such as a graft chain and a radial chain.

A method for synthesizing the cationic group-containing low molecular weight polyether polymer used in the present invention is not limited to a particular method, and any method for synthesizing that can produce a target cationic group-containing low molecular weight polyether polymer can be employed. For example, a base polymer (polyether compound not having a cationic group) is obtained by ring-opening polymerization of a monomer containing an epihalohydrin in the presence of a catalyst composed of an onium salt which is a compound having an atom from group 15 or 16 of the periodic table and trialkylaluminum in which alkyl groups contained are all straight-chained alkyl groups, as disclosed in the Japanese Patent Laid-Open No. 2010-53217. Then, the obtained base polymer is subjected to a reaction with an amine compound such as an imidazole compound to convert a halogen group composing the epihalohydrin monomer unit of the base polymer into an onium halide group. A halide ion composing the onium halide group is further subjected to an anion-exchange reaction, as necessary, to produce a cationic group-containing low molecular weight polyether polymer.

<High Molecular Weight Polyether Polymer>

The high molecular weight polyether polymer composing the polyether polymer composition of the present invention is a polymer composed of an oxirane monomer unit which is a unit obtained by ring-opening polymerization of an oxirane structure part of a compound containing an oxirane structure, and having more than 200 oxirane monomer units. By including a high molecular weight polyether polymer as a component of the polyether polymer composition of the present invention, the high molecular weight polyether polymer shows an action of improving the processability of the polyether polymer composition. As a result, the polyether polymer composition of the present invention is capable of being suitably processed into a sheet.

Specific examples of the oxirane monomer unit may include the same as those for the cationic group-containing low molecular weight polyether polymer described above. The high molecular weight polyether polymer used in the present invention may have two or more oxirane monomer units. A distribution pattern of those repeating units is not limited to a particular pattern in this case, and a random distribution is preferred.

Further, the high molecular weight polyether polymer used in the present invention may be a cationic group-containing high molecular weight polyether polymer containing oxirane monomer units wherein at least a part of the oxirane monomer units is an oxirane monomer unit having a cationic group. It is particularly preferable to include an oxirane monomer unit having a cationic group because this enables compatibility with the cationic group-containing low molecular weight polyether polymer described above to be more appropriately enhanced, which as a result enables the action and effects of the present invention to be shown even more remarkably.

Even when the high molecular weight polyether polymer used in the present invention is a cationic group-containing high molecular weight polyether polymer, it may include two or more oxirane monomer units, and a distribution pattern of those repeating units is not limited to a particular pattern in this case, and a random distribution is preferred. For example, the polyether polymer may include an oxirane monomer unit having two or more cationic groups, or alternatively, may include an oxirane monomer unit having one or two or more cationic groups and an oxirane monomer unit not having one or two or more cationic groups.

The cationic group that can be contained in the high molecular weight polyether polymer is not limited to a particular group, and from the viewpoint of further enhancing compatibility in the case of the above-mentioned cationic group-containing low molecular weight polyether polymer, examples thereof may include the same as those mentioned for the cationic group-containing low molecular weight polyether polymer and preferred aspects thereof may include the same. Further, for the counter anion as well, examples thereof may include the same as those mentioned above.

When the high molecular weight polyether polymer used in the present invention is a cationic group-containing high molecular weight polyether polymer, among oxirane monomer units composing the high molecular weight polyether polymer, at least a part of the oxirane monomer units may be an oxirane monomer unit having a cationic group and, for example, the oxirane monomer units composing the high molecular weight polyether polymer may all have a cationic group or may be a mix of the oxirane monomer units having a cationic group and the oxirane monomer units not having a cationic group. When the high molecular weight polyether polymer used in the present invention is a cationic group-containing high molecular weight polyether polymer, a proportion of oxirane monomer units having a cationic group is not limited to a particular proportion. It is preferably 0.1 mol % or more, more preferably 0.5 mol % or more, particularly preferably 1 mol % or more, based on all oxirane monomer units of the high molecular weight polyether polymer. An upper limit of the proportion of the oxirane monomer units having a cationic group is not limited to a particular value, and is 30 mol % or less based on all the oxirane monomer units of the high molecular weight polyether polymer.

The structure of the high molecular weight polyether polymer used in the present invention is not particularly limited. However, a structure composed of a monomer unit represented by the following general formula (2) is preferred. In the following general formula (2) below, when n is an integer of 1 or more, the high molecular weight polyether polymer used in the present invention is a cationic group-containing high molecular weight polyether polymer.

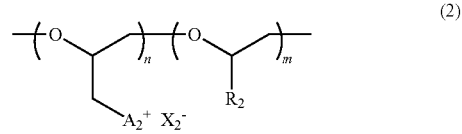

(2)

wherein $A_2^+$ represents a cationic group or a cationic group-containing group, $X_2^-$ represents any counter anion, $R_2$ represents a non-ionic group, n is an integer of 0 or more, m is an integer of 0 or more, and n and m satisfy n+m >200.

In the above general formula (2), $A_2^+$ represents a cationic group or a cationic group-containing group. Specific examples of the cationic group are as described above, and specific examples of the cationic group-containing group include a group containing the cationic group as described above.

In the above general formula (2), $X_2^-$ represents any counter anion. Specific examples of the counter anion are as described above.

In the above general formula (2), $R_2$ represents a non-ionic group and is not limited to a particular group as long as it is a non-ionic group. Examples thereof may include the same as those of $R_1$ in the above-mentioned general formula (1).

In the general formula (2), n may be an integer of 0 or more, m may be an integer of 0 or more, and n and m may satisfy n+m>200. However, n is preferably an integer of 0 to 3,000, more preferably an integer of 0 to 2,000, and further preferably an integer of 50 to 1,500. m is preferably an integer of 0 to 10,000, more preferably an integer of 500 to 8,000, and further preferably an integer of 1,000 to 5,000. In addition, n+m is preferably an integer of 201 to 10,000, more preferably an integer of 500 to 8,000, and further preferably an integer of 1000 to 5,050.

When the structure of the high molecular weight polyether polymer is composed of the monomer unit represented by the above general formula (2), a polymer chain end is not limited to a particular group, and may be any group. Examples of the polymer chain end group include a hydrocarbon group, the above-described cationic groups, a hydroxy group, a hydrogen atom, and the like.

The high molecular weight polyether polymer used in the present invention is composed of more than 200 oxirane monomer units, preferably 201 to 10,000 oxirane monomer units, more preferably 500 to 8,000 oxirane monomer units, and further preferably 1,000 to 5,050 oxirane monomer units. By using a high molecular weight polyether polymer having more than 200 oxirane monomer units, the obtained polyether polymer composition is capable of being suitably processed into a sheet. The number of oxirane monomer units of the high molecular weight polyether polymer can be determined by a method described in EXAMPLES below.

A number average molecular weight (Mn) of the high molecular weight polyether polymer used in the present invention is not limited to a particular value. It is preferably more than 100,000, more preferably 200,000 or more, and particularly preferably 230,000 or more. An upper limit of the number average molecular weight (Mn) is preferably 2,000,000 or less. Further, the molecular weight distribution (Mw/Mn) is preferably 1.0 to 5.0. The number average molecular weight and the molecular weight distribution of the high molecular weight polyether polymer can be determined by a method described in EXAMPLES below.

A chain structure of the high molecular weight polyether polymer used in the present invention is not limited to a particular structure and may be a straight chain or a chain structure having a branch such as a graft chain and a radial chain.

A method for synthesizing the high molecular weight polyether polymer used in the present invention is not limited to a particular method, and any method for synthesizing that can produce a target high molecular weight polyether polymer can be employed. Examples of the method include (A) a method for producing a high molecular weight polyether polymer, which is disclosed in the Japanese Patent Laid-Open No. 2010-53217, by ring-opening polymerization of a monomer containing an oxirane monomer in the presence of a catalyst composed of an onium salt which is a compound having an atom from group 15 or 16 of the periodic table and trialkylaluminum in which alkyl groups contained are all straight-chained alkyl group, (B) a method for producing a high molecular weight polyether polymer, which is disclosed in the Japanese Patent Publication No. 46-27534, by ring-opening polymerization of a monomer mixture containing an oxirane monomer in the presence of a catalyst prepared by a reaction of tri-isobutylaluminum with phosphoric acid and triethylamine, and the like.

When the high molecular weight polyether polymer used in the present invention is a cationic group-containing high molecular weight polyether polymer, examples of a method for synthesizing the cationic group-containing high molecular weight polyether polymer include the following method: In the above method (A) or (B), at least epihalohydrin such as epichlorohydrin, epibromohydrin, and epiiodohydrin is used as a monomer to produce a high molecular weight polyether polymer not having a cationic group. The produced high molecular weight polyether polymer not having a cationic group is subjected to a reaction with an amine compound such as an imidazole compound to convert a halogen group composing the epihalohydrin monomer unit of the high molecular weight polyether polymer into an onium halide group. A halide ion composing the onium halide group is further subjected to an anion-exchange reaction, as necessary, to produce a cationic group-containing high molecular weight polyether polymer.

The ratio between the cationic group-containing low molecular weight polyether polymer and the high molecular weight polyether polymer in the polyether polymer composition of the present invention is, in terms of a weight ratio of "cationic group-containing low molecular weight polyether polymer:high molecular weight polyether polymer", preferably 20:1 to 1:20, more preferably 10:1 to 1:10, further preferably 7:1 to 1:7, and particularly preferably 4:1 to 1:4. Setting the ratio between the cationic group-containing low molecular weight polyether polymer and the high molecular weight polyether polymer in the above range enables the effect of enhancing various properties of the metal-containing powder such as high heat conductivity and high electrical conductivity, the effect of enhancing long-term stability, and the effect of enhancing sheet processability to be more appropriately increased. In the present invention, by setting a relatively larger compounding proportion of the cationic group-containing low molecular weight polyether polymer, the polyether polymer composition of the present invention can have better compatibility with the metal-containing powder, which enables a filling proportion of the metal-containing powder to be more appropriately increased while maintaining good long-term stability. As a result, the effect of enhancing various properties of the metal-containing powder such as high heat conductivity and high electrical conductivity can be further increased. Further, in the present invention, by setting a relatively larger blend proportion of the high molecular weight polyether polymer, the polyether polymer composition of the present invention is capable of being more suitably processed into a sheet.

<Metal-Containing Powder>

The polyether polymer composition of the present invention includes the above-described cationic group-containing low molecular weight polyether polymer and high molecular weight polyether polymer, and a metal-containing powder.

Examples of the metal-containing powder used in the present invention may include a powder of a single metal or an alloy or a compound having a metal atom. However, a metal powder (a powder of a single metal or an alloy powder), a metal oxide powder, and a metal nitride powder are preferably used.

Examples of the metal powder include an aluminum powder, a gold powder, a silver powder, a copper powder, a nickel powder, an indium powder, a gallium powder, a metal silicon powder, and the like. Among these examples, the silver powder and the copper powder are preferably used.

Examples of the metal oxide powder include a zinc oxide powder, a silica powder, a titanium oxide powder, an alumina powder, a silver oxide powder, a zirconium oxide powder, a magnesium oxide powder, and the like. Among these examples, the zinc oxide powder is preferably used.

Examples of the metal nitride powder include a boron nitride powder, an aluminum nitride powder, and the like.

In the present invention, depending on properties of a polyether polymer composition to be produced, the metal-containing powder may be appropriately selected from the above examples and used, and these examples may be used singly or in combinations of two or more. For example, a metal oxide powder and a metal powder can be used in combination, and a zinc oxide powder and a silver powder or a copper powder can be used in combination.

For example, when the polyether polymer composition of the present invention is used for an application that requires heat conductivity, a polyether polymer composition containing a metal oxide powder and a metal nitride powder as a metal-containing powder preferably in a total proportion of 200 to 2000 parts by weight, more preferably in a total proportion of 300 to 1750 parts by weight, further preferably in a total proportion of 400 to 1300 parts by weight, and containing a metal powder preferably in a proportion of 0 to 1800 parts by weight, more preferably in a proportion of 50 to 1500 parts by weight, further preferably in a proportion of 100 to 1000 parts by weight, per a total of 100 parts by weight of the cationic group-containing low molecular weight polyether polymer and high molecular weight polyether polymer, is used. Including the metal oxide powder and the metal nitride powder, or the metal powder in a proportion of the above range allows the polyether polymer composition of the present invention to have particularly excellent heat conductivity.

When the polyether polymer composition of the present invention is used for an application that requires electrical conductivity, a polyether polymer composition containing a metal powder as a metal-containing powder preferably in a proportion of 200 to 2000 parts by weight, more preferably in a proportion of 350 to 1800 parts by weight, further preferably in a proportion of 500 to 1400 parts by weight, per a total of 100 parts by weight of the cationic group-containing low molecular weight polyether polymer and high molecular weight polyether polymer, is used. On the other hand, in this case, although the metal oxide powder and the metal nitride powder may be contained in the polyether polymer composition of the present invention, it is preferred that these powders be not substantially contained. Including the metal powder in a proportion of the above range allows the polyether polymer composition of the present invention to have particularly excellent electrical conductivity.

A shape of the metal-containing powder used in the present invention is not limited to a particular shape and may be an indefinite shape besides a scale-like shape, a teardrop-like shape, a spherical shape, a needle shape, and an irregular shape. Additionally, a metal-containing powder that has been surface treated beforehand may be used.

A particle size of the metal-containing powder used in the present invention is not limited to a particular size. However, an average particle size is preferably 0.01 µm or more and less than 50 µm, preferably 0.02 µm or more and less than 40 µm. When the average particle size is too large, flatness of a surface of a sheet composed of the polyether polymer composition of the present invention is lessened in some cases, which causes an increase in contact resistance (heat resistance, electrical resistance) in some cases. When the average particle size is too small, on the other hand, contact points between metal-containing powders in the polyether polymer composition are lessened, which causes a decrease in heat conductivity and electrical conductivity in some cases.

A content of the metal-containing powder in the polyether polymer composition of the present invention is 200 parts by weight or more, preferably 350 parts by weight or more, and more preferably 500 parts by weight or more, per a total of 100 parts by weight of the cationic group-containing low molecular weight polyether polymer and high molecular weight polyether polymer. An upper limit of the content is not limited to a particular value, and it is usually 2000 parts by weight or less, preferably 1800 parts by weight or less, and more preferably 1400 parts by weight or less. According to the polyether polymer composition of the present invention, even when a relatively large amount of the metal-containing powder is included as described above, the metal-containing powder can be dispersed well in the cationic group-containing low molecular weight polyether polymer and high molecular weight polyether polymer by the action of the cationic group-containing low molecular weight polyether polymer that shows high compatibility with such a metal-containing powder, and as a result, the contact points between the metal-containing powders can be suitably ensured. For that reason, various properties of the metal-containing powder such as high heat conductivity and high electrical conductivity can be appropriately shown. Additionally, according to the polyether polymer composition of the present invention, even when a relatively large amount of the metal-containing powder as described above is included, the agglomeration of the metal-containing powder can be effectively prevented even after a lapse of long time, and excellent long-term stability is provided. On the other hand, when the content of the metal-containing powder is too small, properties of the metal-containing powder such as high heat conductivity and high electrical conductivity are not sufficiently provided and this tends to be remarkable especially when the polyether polymer composition is molded into a sheet form.

In order to appropriately show properties of the metal-containing powder such as high heat conductivity and high electrical conductivity with a conventional manner in particular, even when a relatively large amount of the metal-containing powder as described above was included in various polymers, it was generally difficult for the metal-containing powder to be dispersed well in a polymer. For that reason, in practical situations, properties of the metal-containing powder such as high heat conductivity and high electrical conductivity could not be shown sufficiently in some cases, or even molding the polymer into a desired form was difficult in the first place. Further, even if it was possible to disperse the metal-containing powder well, the metal-containing powder was agglomerated after long-term use and as a result, the properties of the metal-containing powder such as high heat conductivity and high electrical conductivity could not be shown sufficiently. In contrast to the above, according to the present invention, the above-described cationic group-containing low molecular weight polyether polymer and high molecular weight polyether polymer are used in combination as a matrix polymer, which effectively allows such problems to be solved.

<Method for Producing Polyether Polymer Composition>

The polyether polymer composition of the present invention can be produced by mixing the above-described cationic group-containing low molecular weight polyether polymer and high molecular weight polyether polymer with the above-described metal-containing powder. A method for mixing the cationic group-containing low molecular weight polyether polymer and high molecular weight polyether polymer with the metal-containing powder is not limited to a particular method. A known mixing method can be employed, such as a method of mixing while applying a shear force by a mill, an automatic mortar, or a kneader, and a mixing method using ultrasonic waves.

Further, when mixing the cationic group-containing low molecular weight polyether polymer and the high molecular weight polyether polymer with the metal-containing powder, the mixing may be performed under substantially solvent-free conditions or performed in a solvent, but it is preferable to perform the mixing under substantially solvent-free conditions. In the present invention, since the cationic group-containing low molecular weight polyether polymer and the high molecular weight polyether polymer are used in combination as the polyether polymer, these substances can be suitably mixed with the metal-containing powder by use of them in combination, even under substantially solvent-free conditions. By substantially not using a solvent, the production process can be simplified and production stability can be enhanced.

In particular, in the present invention, of those polyether polymers having different molecular weights, by performing the mixing while applying a shear force to the high molecular weight polyether polymer, a shear stress is produced between the polymer and the metal-containing powder, which enables macroscopic physical mixing to be promoted. On the other hand, the cationic group-containing low molecular weight polyether polymers show a high interaction with the surface/interface of the metal-containing powder, which allows micro dispersion to be promoted. Further, according to the present invention, due to the action of the high molecular weight polyether polymer and the cationic group-containing low molecular weight polyether polymer, mixing with the metal-containing powder can be suitably carried out even under substantially solvent-free conditions.

In this case, as the method for mixing these, for example, there may be employed a method in which the cationic group-containing low molecular weight polyether polymer and the high molecular weight polyether polymer are mixed in advance and then the metal-containing powder is added and mixed, or a method in which a mixture formed by mixing the cationic group-containing low molecular weight polyether polymer and a high molecular weight polyether polymer in advance is added to the metal-containing powder and mixed. In addition, there may also be employed a method in which the metal-containing powder is added and mixed into the cationic group-containing low molecular weight polyether polymer and then the high molecular weight polyether polymer is added and further mixed, or a method in which the metal-containing powder is added and mixed into the high molecular weight polyether polymer and then the cationic group-containing low molecular weight polyether polymer is added and further mixed. During the mixing, the mixing may be performed with a commonly used kneader or stirrer, or may be performed with a mill or an automatic mortar.

The solvent used when performing the mixing in a solvent is not limited to a particular solvent. A polar solvent is suitably used in terms of the fact that the polar solvent allows the metal-containing powder to be dispersed better in the cationic group-containing low molecular weight polyether polymer and high molecular weight polyether polymer. Examples of the polar solvent include ether such as tetrahydrofuran and anisole; ester such as ethyl acetate and ethyl benzoate; ketone such as acetone, 2-butanone, and acetophenone; an aprotic polar solvent such as acetonitrile, dimethylformamide, dimethylacetamide, dimethylsulfoxide, and N-methylpyrrolidone; a protic polar solvent such as ethanol, methanol, and water; and the like. These solvents may be used singly or can be used as a mixed solvent of two or more. An amount used of the solvent is not limited to a particular amount. The amount of the solvent may be set so that a total content rate of the cationic group-containing low molecular weight polyether polymer and high molecular weight polyether polymer and the metal-containing powder in the solvent is in a range from 0.1 to 80% by weight.

<Other Components>

The polyether polymer composition of the present invention may contain other components in addition to the cationic group-containing low molecular weight polyether polymer, the high molecular weight polyether polymer, and the metal-containing powder. The other components are not limited to a particular component and examples thereof include a polymer material other than the above-described cationic group-containing low molecular weight polyether polymer and high molecular weight polyether polymer; an inorganic fiber such as a glass fiber and a carbon fiber; an organic solvent; an ionic liquid; and the like. When the cationic group-containing low molecular weight polyether polymer and/or high molecular weight polyether polymer has a cross-linkable monomer unit, a cross-linker may be included therein to produce a cross-linkable composition, and in this case, a cross-linking aid or a cross-linking promoter may be included as necessary. In particular, the polyether polymer composition of the present invention produced as a cross-linkable composition is cross-linked to produce a cross-linked product, and thereby it is possible to appropriately maintain the actions and effects of the present invention, specifically the following effects: various properties of a metal-containing powder such as high heat conductivity and high electrical conductivity can be appropriately shown and also excellent long-term stability can be provided; and at the same time, mechanical strength as a structural material can be improved. The cross-linker may be selected according to a structure of a cross-linkable monomer unit to be used and the like, and is not limited to a particular cross-linker.

The polymer material other than the above-described cationic group-containing low molecular weight polyether polymer and high molecular weight polyether polymer is not limited to a particular material and examples thereof include a rubber material such as an acrylonitrile-butadiene rubber, a styrene-butadiene rubber, a butadiene rubber, an isoprene rubber, an acrylic rubber, an ethylene-propylene rubber, a urethane rubber, a fluororubber, and a silicon rubber; a thermoplastic elastomer material such as styrene-isoprene-styrene, styrene-butadiene-styrene, and styrene-ethylene-butadiene-styrene; a resin material such as PMMA, polyethylene, polypropylene, polystyrene, polycarbonate, ABS, vinyl chloride, and PET; a photo-curable or thermosetting resin such as an epoxy resin, a urethane resin, and a thermosetting or photo-curable acrylate resin; and the like.

According to the above, the polyether polymer composition of the present invention is produced by compounding 200 parts by weight or more of the metal-containing powder per a total of 100 parts by weight of the above-described cationic group-containing low molecular weight polyether polymer and high molecular weight polyether polymer. According to the polyether polymer composition of the present invention, since the metal-containing powder can be dispersed well in the cationic group-containing low molecular weight polyether polymer and high molecular weight polyether polymer mainly by the action of the cationic group-containing low molecular weight polyether polymer, various properties of the metal-containing powder such as high heat conductivity and high electrical conductivity can be appropriately shown, and further, the agglomeration of the metal-containing powder even after a lapse of long time can be effectively prevented and excellent long-term stability is also provided. In addition, the polyether polymer composition of the present invention can be suitably processed into a sheet as a result of its excellent sheet processability mainly by the action of the high molecular weight polyether polymer, and hence by molding the polyether polymer composition into a sheet form, it can be suitably used as various sheets and the like, such as a heat dissipating sheet having high heat conductivity and excellent long-term stability and an electrically conductive sheet having high electrical conductivity and excellent long-term stability.

According to the polyether polymer composition of the present invention, a heat conductivity measured 5 days after production of the polyether polymer composition can be 2.3 W/(m·K) or more and 4.0 W/(m·K) or less. Further, according to the polyether polymer composition of the present invention, a ratio (heat conductivity (2 months)/heat conductivity (5 days)) of the heat conductivity measured 2 months after production of the polyether polymer composition to the heat conductivity measured 5 days after production of the polyether polymer composition can be 0.92 or more, and even 0.94 or more. The heat conductivity measured 5 days after or 2 months after the production of the polyether polymer composition can be determined by a method described in EXAMPLES described below.

According to the polyether polymer composition of the present invention, a surface resistance measured 5 days after production of the polyether polymer composition can be $9.8 \times 10^{-4}$ Ω/sq or less and $6.5 \times 10^{-4}$ Ω/sq or more. Further, according to the polyether polymer composition of the present invention, a ratio (surface resistance (2 months)/ surface resistance (5 days)) of the surface resistance measured 2 months after production of the polyether polymer composition to the surface resistance measured 5 days after production of the polyether polymer composition can be 1.10 or more, and even 1.08 or less. The surface resistance measured 5 days after or 2 months after the production of the polyether polymer composition can be determined by a method described in EXAMPLES described below.

EXAMPLES

Hereinafter, the present invention will be described with reference to more detailed examples. However, the present invention is not limited to these examples. Note that the term "part(s)" mentioned below is based on weight unless otherwise noted. Further, tests and evaluations were conducted in accordance with the description below.

(1) Number of Repeating Units, Number Average Molecular Weight (Mn), and Molecular Weight Distribution (Mw/Mn) of Polyether Polymer A number average molecular weight (Mn) and a molecular weight distribution (Mw/Mn) of a polyether polymer not having a cationic group was measured by gel permeation chromatography (GPC) with tetrahydrofuran as a solvent and calculated as a polystyrene equivalent value. HLC-8320 (manufactured by Tosoh Corporation) was used as a measuring instrument in which two columns of TSKgelα-M (manufactured by Tosoh Corporation) were connected in series and the differential refractometer RI-8320 (manufactured by Tosoh Corporation) was used as a detector. The resultant number average molecular weight was divided by a molecular weight of repeating units composing the polyether polymer to calculate the number of the repeating units.

A number average molecular weight of the cationic group-containing polyether polymer is determined as follows. That is, first of all, an average molecular weight of all repeating units composing the cationic group-containing polyether polymer is determined from an average molecular weight of repeating units of the polyether polymer not having a cationic group in which the cationic group has not yet been introduced, an average molecular weight of oxirane monomer units having a cationic group, and a content rate of the oxirane monomer units having a cationic group determined by (2) below. Then, the number of repeating units of the polyether polymer not having a cationic group in which a cationic group has not yet been introduced was multiplied by the average molecular weight of the all repeating units composing the cationic group-containing polyether polymer, and the resultant value was determined as the number average molecular weight of the cationic group-containing polyether polymer.

A molecular weight distribution of the cationic group-containing polyether polymer was used as it is, assuming that the molecular weight distribution was not changed from the molecular weight distribution of the polyether polymer not having a cationic group in which a cationic group has not yet been introduced.

(2) Structure of Polyether Polymer and Content Rate of Oxirane Monomer Unit Having Cationic Group A structure of the polyether polymer and a content rate of an oxirane monomer unit having a cationic group in a cationic group-containing polyether polymer were measured as follows using a nuclear magnetic resonator (NMR). That is, first of all, 30 mg of a sample polyether polymer was added to 1.0 mL of deuterated chloroform or deuterated dimethylsulfoxide, which was shaken for 1 hour so that the sample polyether polymer was dissolved uniformly. The resultant solution was then subjected to an NMR measurement to obtain $^1$H-NMR spectrum, and a structure of the polyether polymer was determined in accordance with a usual method.

Further, the content rate of the oxirane monomer unit having a cationic group in the cationic group-containing polyether polymer was calculated by the following method. That is, first of all, a mole number B1 of all oxirane monomer units was calculated from an integrated value of a proton derived from an oxirane monomer unit as a main chain. Next, a mole number B2 of the oxirane monomer unit having a cationic group was calculated from an integrated value of a proton derived from a cationic group. Then, a proportion of B2 to B1 (percentage) was determined as the content rate of the oxirane monomer unit having a cationic group in the cationic group-containing polyether polymer.

(3) Heat Conductivity

Heat conductivity of each polymer composition 5 days after the production of each polymer composition was measured with a heat conductivity measurement device ("MentorGraphics DynTIM Tester" manufactured by Mentor Graphics Japan Co., Ltd.) using the following method. That is, first of all, each sample polymer composition was formed into a disk-shaped test piece having a size of φ12.8 mm, which was hand-pressed to adjust a thickness so that the thickness of each sample was in a range from 0.1 mm to 1.0 mm to prepare a plurality of measurement samples each having a different thickness. The prepared measurement sample was sandwiched between a heated portion and a measurement portion of the heat conductivity measurement device with a measurement temperature difference between the heated portion and the measurement portion being 10° C., and heat resistance in a thickness direction was measured in a measurement environment in which an atmosphere is 25° C. This heat resistance measurement was performed on the plurality of measurement samples each having a different thickness, and the produced measurement results were then plotted using a linear approximate expression to calculate the heat conductivity.

Further, the above heat conductivity measurement was also performed on the polymer compositions 5 days after the production of each polymer composition as well as on the polymer compositions 2 months after the production. These measurement results were compared to check their long-term stability.

(4) Electrical Conductivity

Surface resistance of each polymer composition was measured using polymer compositions 5 days after the production of each polymer composition with a low resistivity meter ("Loresta-GP" manufactured by Mitsubishi Chemical Analytech Co., Ltd. A PSP probe was selected as a 4-point probe) using the following method in accordance with JIS K 7194. First of all, 1.0 g of each sample polymer composition was press-molded at a temperature ranging from 100° C. to 150° C. and a pressure ranging from 0.1 to 1.0 MPa to form a thin film having a thickness of 100 to 500 μm, which was subsequently cut into a square shape of 10×10 mm to prepare a measurement sample. Next, the prepared measurement sample was secured to an insulating board of the low resistivity meter, and the probe was pressed against the center of one side (side A) of the measurement sample and then a voltage of 10 V was applied to measure a resistance value of the measurement sample. Based on the resistance value obtained from the measurement, a size of a measurement sample, and a measurement position, surface resistance (unit: Ω/sq) was determined using an arithmetic equation that has been internally stored in the low resistivity meter. In the present measurement, this measurement was also performed on the other side (side B) of the measurement sample in the same manner as above to calculate an average value of the surface resistance measured with respect to the side A and side B, and the calculated average value was determined as the surface resistance of the measurement sample.

Further, the above measurement of the surface resistance was also performed on the polymer compositions 5 days after the production of each polymer composition as well as on the polymer compositions 2 months after the production. These measurement results were compared to check long-term stability.

(5) Dispersibility after Storing for a Long Time

A dispersed state-retaining property of each polymer composition was morphologically observed by a scanning electron microscope (SEM) to evaluate long-term stability. Specifically, with the above-mentioned morphological observation, dispersibility after storing for a long time was evaluated in accordance with the following standards. It can be determined that the more excellent the dispersibility after storing for a long time is, the more excellent the long-term stability is.

Very good: The matrix polymer and the metal-containing powder retained a good dispersed state even 2 months after the production of the polymer composition.

Good: Although the matrix polymer and the metal-containing powder showed a good dispersed state for 1 week after the production of the polymer composition, the dispersed state was slightly deteriorated 2 months after the production.

Poor: When a polymer composition was produced, the polymer composition was not capable of being formed into a sheet form and was ended up in a powder form. Either that, or when a polymer composition was produced, the polymer composition was capable of being formed into a sheet form, but agglomeration of the metal-containing powder was confirmed 5 days after the production.

Production Example 1

(Synthesis of Imidazolium Structure-Containing Low Molecular Weight Polyether Polymer A)

To a glass reactor vessel purged with argon and equipped with a stirrer, 0.322 g of tetranormalbutylammonium bromide and 50 ml of toluene were added and cooled to 0° C. Next, 0.137 g of triethylaluminum (1.2 equivalents based on tetranormalbutylammonium bromide) dissolved in 10 ml of normal hexane was added to allow a reaction to proceed for 15 minutes to produce a catalyst composition. To the resultant catalyst composition, 10.0 g of epichlorohydrin was added to carry out a polymerization reaction at 0° C. After the polymerization reaction was initiated, viscosity of the solution was gradually increased. After the reaction proceeded for 12 hours, a small amount of water was poured into the polymerization reaction solution to stop the reaction. The resultant polymerization reaction solution was washed with 0.1 N of a hydrochloric acid aqueous solution to decalcify a catalyst residue and was further washed with ion-exchange water. After that, an organic phase was dried under reduced pressure at 50° C. for 12 hours. As a result, a starch syrup-like substance was produced in a yield of 10.0 g. According to GPC performed on the produced starch syrup-like substance, a number average molecular weight (Mn) was 10,300, a molecular weight distribution (Mw/Mn) was 1.2, and the number of repeating units (the number of oxirane monomer units) was approximately 111. Based on the above, the produced starch syrup-like substance was identified as polyether polymer A" composed of an epichlorohydrin unit having a bromomethyl group at a polymerization-initiating end and a hydroxy group at a polymerization-terminating end. A monomer composition ratio of the epichlorohydrin monomer unit in polyether polymer A" was 100 mol %.

Next, 5.0 g of polyether polymer A" produced as above, 12.1 g of 1-methylimidazole, and 10.0 g of acetonitrile were added to a glass reactor vessel purged with argon and equipped with a stirrer, and heated to 80° C. After the reaction proceeded at 80° C. for 48 hours, the solution was cooled to a room temperature to stop the reaction. The resultant reactant was washed with an equal weight mixed solution of toluene/methanol/water, and then an organic phase containing 1-methylimidazole and toluene was removed and an aqueous phase was dried under reduced pressure at 50° C. for 12 hours, which eventually produced 9.4 g of a light reddish solid. This solid was determined by a $^1$H-NMR measurement and elemental analysis. As a result, the solid was identified as imidazolium structure-containing polyether polymer A' having a halide ion as a counter anion in which, in polyether polymer A" that is a starting material, all chloro groups included in repeating units were replaced with a 1-methylimidazolium group having a chloride ion as a counter anion and a bromo group of a bromomethyl group at a polymerization-initiating end was replaced with a 1-methylimidazolium group having a bromide ion as a counter anion.

Then, 2.5 g of imidazolium structure-containing polyether compound A' having a halide ion as a counter anion produced as above, 4.1 g of lithium bis(trifluoromethanesulfonyl)imide, and 20 mL of ion-exchange water were added to a glass reactor vessel equipped with a stirrer. After the reaction proceeded at a room temperature for 30 minutes, the solution was dried under reduced pressure at 50° C. for 12 hours. The resultant solid-liquid mixture was washed with water to remove an inorganic salt, and then a liquid phase was extracted with toluene. The resultant toluene solution was dried under reduced pressure at 50° C. for 12 hours, which eventually produced 5.4 g of a rubber-like substance. The produced rubber-like substance was determined by a $^1$H-NMR spectrum measurement and elemental analysis. As a result, the rubber-like substance was identified as imidazolium structure-containing low molecular weight polyether polymer A having a bis(trifluoromethanesulfonyl)imide anion as a counter anion in which all chloride ions and bromide ions of imidazolium structure-containing polyether compound A' having a halide ion as a counter ion that is a starting material were replaced with a bis(trifluoromethanesulfonyl)imide anion. According to imidazolium structure-containing low molecular weight polyether polymer A, a number average molecular weight (Mn) was 47,000, a molecular weight distribution (Mw/Mn) was 1.2, and the number of repeating units (the number of oxirane monomer units) was approximately 111. Further, a monomer composition ratio of the imidazolium structure-containing monomer unit in the imidazolium structure-containing low molecular weight polyether polymer A was theoretically 100 mol %. A content rate of the oxirane monomer unit having a 1-methylimidazolium group as a cationic group measured in accordance with the above method was 100 mol %.

Production Example 2

(Synthesis of High Molecular Weight Polyether Polymer B)

A sealed pressure-resistant glass container was purged with nitrogen, and 200 parts of toluene and 60 parts of triisobutylaluminum were supplied. The glass bottle was cooled by immersing in ice water, and then 230 parts of diethyl ether was added and the mixture was stirred. Next, while cooling with ice water, 13.6 parts of phosphoric acid was added, and the mixture was further stirred. At this time, since the internal pressure of the container increased due to a reaction between the triisobutylaluminum and the phosphoric acid, the pressure was appropriately reduced. The obtained reaction mixture was subjected to an aging reaction in a 60° C. warm water bath for 1 hour to obtain a catalyst solution.

Separately from the above, 223.5 parts of epichlorohydrin, 27.5 parts of allyl glycidyl ether, 19.7 parts of ethylene oxide, and 2585 parts of toluene were put into an autoclave, the temperature of the contents solution was increased to 50° C. while stirring under a nitrogen atmosphere, and then 11.6 parts of the catalyst solution prepared above were added to initiate a reaction. Next, from the start of the reaction, a solution of 129.3 parts of ethylene oxide dissolved in 302 parts of toluene was continuously added at an even speed over 5 hours. In addition, 6.2 parts of the catalyst solution was added over 5 hours every 30 minutes after the start of the reaction. Then, after the reaction proceeded for 5 hours, 15 parts of water was added and stirred to stop the reaction, and 45 parts of a solution of 4,4'-thiobis-(6-tert-butyl-3-methylphenol) in 5% toluene was further added thereto and stirred as an anti-aging agent. Next, steam stripping was carried out, supernatant water is removed, and then the resultant mixture was vacuum dried at 60° C. to obtain 400 parts of a high molecular weight polyether polymer B composed of an epichlorohydrin unit, an allyl glycidyl ether unit, and an ethylene oxide unit. The number average molecular weight (Mn) of the obtained high molecular weight polyether polymer B determined by GPC was 247,000, the molecular weight distribution (Mw/Mn) was 3.6, and the number of repeating units (number of oxirane monomer units) was approximately 3,700. The monomer composition ratio of the high molecular weight polyether polymer B was 40 mol % of the epichlorohydrin monomer unit, 56 mol % of the ethylene oxide monomer unit, and 4 mol % of the allyl glycidyl ether monomer unit.

Production Example 3

(Synthesis of Imidazolium Structure-Containing High Molecular Weight Polyether Polymer C)

To a glass reactor vessel equipped with a stirrer, 181 parts of the high molecular weight polyether polymer B obtained above and 1211 parts of toluene were added, and the mixture was stirred at 50° C. for 12 hours to dissolve a high molecular weight polyether polymer B. Next, 70 parts of methanol was added and stirred for 15 minutes. Then, 93 parts of 1-methylimidazole was added to the solution, and the temperature was increased to 75° C. while stirring, and then a reaction was performed at 75° C. for 48 hours. After the reaction proceeded for 48 hours, the reaction solution was cooled to 20° C. to stop the reaction. The obtained reaction solution was solidified by distilling off the solvent with steam, and then vacuum-dried to obtain a yield of 192 parts of an imidazolium structure-containing high molecular weight polyether polymer C having a halide ion as a counter anion in which a part of the chloro groups contained in the repeating units of the high molecular weight polyether polymer B of the starting material was replaced with a 1-methylimidazolium group having a chloride ion as a counter anion. The number average molecular weight (Mn) of the obtained imidazolium structure-containing high molecular weight polyether polymer C was 250,000, the molecular weight distribution (Mw/Mn) was 3.6, and the number of repeating units (number of oxirane monomer units) was approximately 3,700. In addition, for the obtained imidazolium structure-containing high molecular weight polyether polymer C, the content rate of the oxirane monomer units having a 1-methylimidazolium group as a cationic group measured in accordance with the above method was 1.9 mol %.

Example 1

33 parts of the imidazolium structure-containing low molecular weight polyether polymer A produced in Production Example 1, 67 parts of the imidazolium structure-containing high molecular weight polyether polymer C produced in Production Example 3, and 407 parts of a zinc oxide powder (manufactured by KANTO CHEMICAL CO., INC., average particle size of 5 to 10 μm) and 207 parts of a copper powder (manufactured by Sigma-Aldrich, Co. LLC, average particle size of 14 to 25 μm) as a metal-containing powder were put into a Plasti-Corder Lab Station (W50EHT) manufactured by Brabender GmbH & Co. KG heated to 50° C., and subjected to shear mixing for 10 minutes at a speed of 50 rpm to obtain a rubber-like polymer composition. Next, the produced rubber-like polymer composition was placed in a mold of 30×30×1.0 mm and pressed at 120° C. and 5 MPa to produce a sheet-form heat dissipating polymer composition. Measurements and an evaluation of heat conductivity and dispersibility after storing for a long time were performed on the produced sheet-form heat dissipating polymer composition in accordance with the above method. The results are shown in Table 1.

Example 2

A sheet-form heat dissipating polymer composition was produced in the same manner as in Example 1 except that 67 parts of high molecular weight polyether polymer B produced in Production Example 2 was used instead of 67 parts of imidazolium structure-containing high molecular weight polyether polymer C produced in Production Example 3. Measurements and an evaluation of heat conductivity and dispersibility after storing for a long time were performed on the produced sheet-form heat dissipating polymer composition in accordance with the above method. The results are shown in Table 1.

Example 3

67 parts of the imidazolium structure-containing low molecular weight polyether polymer A produced in Production Example 1, 33 parts of the imidazolium structure-containing high molecular weight polyether polymer C produced in Production Example 3, and 600 parts of a zinc oxide powder (manufactured by KANTO CHEMICAL CO., INC., average particle size of 5 to 10 μm) and 300 parts of a copper powder (manufactured by Sigma-Aldrich, Co. LLC, average particle size of 14 to 25 μm) as a metal-containing powder were put into a Plasti-Corder Lab Station (W50EHT) manufactured by Brabender GmbH & Co. KG heated to 50° C., and subjected to shear mixing for 10 minutes at a speed of 50 rpm to obtain a rubber-like polymer composition. Next, the produced rubber-like polymer composition was placed in a mold of 30×30×0.5 mm and pressed at 120° C. and 5 MPa to produce a sheet-form heat dissipating polymer composition. Measurements and an evaluation of heat conductivity and dispersibility after storing for a long time were performed on the produced sheet-form heat dissipating polymer composition in accordance with the above method. The results are shown in Table 1.

Example 4

A sheet-form heat dissipating polymer composition was produced in the same manner as in Example 3 except that 33 parts of high molecular weight polyether polymer B produced in Production Example 2 was used instead of 33 parts of imidazolium structure-containing high molecular weight polyether polymer C produced in Production Example 3. Measurements and an evaluation of heat conductivity and dispersibility after storing for a long time were performed on the produced sheet-form heat dissipating polymer composition in accordance with the above method. The results are shown in Table 1.

Comparative Example 1

100 parts of liquid-form butadiene rubber (manufactured by Sigma-Aldrich, Co. LLC, number average molecular weight: 3,000, molecular weight distribution: 1.5), 407 parts of a zinc oxide powder (manufactured by KANTO CHEMICAL CO., INC., average particle size of 5 to 10 μm) and 207 parts of a silver powder (manufactured by Sigma-Aldrich, Co. LLC, average particle size of 5 to 8 μm) as a metal-containing powder, and 714 parts of toluene as a solvent were put into an automatic mortar and then mixed at a room temperature for 30 minutes. The resultant composition was further mixed while heating, and then further dried under conditions that the resultant composition was dried in a vacuum dryer of 0.01 MPa or less at 60° C. for 12 hours or more, which produced a polymer composition. The heat dissipating polymer composition produced in Comparative Example 1 was a grease form, and thus it was not capable of being molded into a sheet form. Further, although the heat dissipating polymer composition produced in Comparative Example 1 was in a grease form immediately after the production, the zinc oxide powder and the silver powder were agglomerated as time went by and the composition turned into a powder form after 5 days. Measurements and an evaluation were performed on such a powder-form heat dissipating polymer composition in accordance with the above method. In Comparative Example 1, an attempt was made to measure heat conductivity of a disk-shaped test piece after 2 months. However, keeping the shape of the test piece was difficult, so that the test piece was unmeasurable. The results are shown in Table 1.

Comparative Example 2

A heat dissipating polymer composition was produced in the same manner as in Comparative Example 1 except that 100 parts of a liquid-form silicone rubber (manufactured by Gelest, Inc., number average molecular weight: 6,000, molecular weight distribution: 2.1) was used instead of the liquid-form butadiene rubber. The heat dissipating polymer composition produced in Comparative Example 2 was agglomerated in a powder form, and thus it was not capable of being molded into a sheet form. Measurements and an evaluation were performed on the produced powder-form heat dissipating polymer composition in accordance with the above method. In Comparative Example 2, an attempt was made to measure heat conductivity of a disk-shaped test piece after 2 months. However, keeping the shape of the test piece was difficult, so that the test piece was unmeasurable. The results are shown in Table 1.

Comparative Example 3

A heat dissipating polymer composition was produced in the same manner as in Comparative Example 1 except that 100 parts of a high-molecular-weight styrene-butadiene rubber (number average molecular weight: 250,000, molecular weight distribution: 2.6) was used instead of the liquid-form butadiene rubber and in addition, 207 parts of the copper powder (manufactured by Sigma-Aldrich, Co. LLC, average particle size of 14 to 25 μm) was used instead of the silver powder. The heat dissipating polymer composition produced in Comparative Example 3 was agglomerated in a powder form, and thus it was not capable of being molded into a sheet form. Measurements and an evaluation were performed on the produced powder-form heat dissipating polymer composition in accordance with the above method. In Comparative Example 3, an attempt was made to measure heat conductivity of a disk-shaped test piece after 2 months.

mer composition in accordance with the above method. In Comparative Example 4, an attempt was made to measure heat conductivity of disk-shaped test pieces each 5 days and 2 months after the production. However, keeping the shape of the test pieces was difficult, so that the test pieces were unmeasurable. The results are shown in Table 1.

[Table 1]

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition | Imidazolium structure-containing low molecular weight polyether polymer A | (parts) | 33 | 33 | 67 | 67 | — | — | — | — |
| | High molecular weight polyether polymer B | (parts) | — | 67 | — | 33 | — | — | — | — |
| | Imidazolium structure-containing high molecular weight polyether polymer C | (parts) | 67 | — | 33 | — | — | — | — | — |
| | Liquid-form butadiene rubber | (parts) | — | — | — | — | 100 | — | — | — |
| | Liquid-form silicone rubber | (parts) | — | — | — | — | — | 100 | — | — |
| | Styrene-butadiene rubber | (parts) | — | — | — | — | — | — | 100 | — |
| | Silicone rubber | (parts) | — | — | — | — | — | — | — | 100 |
| | Zinc oxide powder | (parts) | 407 | 407 | 600 | 600 | 407 | 407 | 407 | 407 |
| | Copper powder | (parts) | 207 | 207 | 300 | 300 | — | — | 207 | 207 |
| | Silver powder | (parts) | — | — | — | — | 207 | 207 | — | — |
| Initial form of sample | | | Sheet form | Sheet form | Sheet form | Sheet form | Grease form to powder form | Powder form | Powder form | Powder form |
| Heat conductivity after 5 days | | (W/(m × K)) | 2.54 | 2.43 | 3.23 | 3.09 | 0.3 | 0.2 or less | 0.2 or less | Unmeasurable |
| Heat conductivity after 2 months | | (W/(m × K)) | 2.39 | 2.31 | 3.06 | 2.92 | Unmeasurable | Unmeasurable | Unmeasurable | Unmeasurable |
| Dispersibility after storing for a long time | | | Very Good | Very Good | Very Good | Very Good | Poor | Poor | Poor | Poor |

However, keeping the shape of the test piece was difficult, so that the test piece was unmeasurable. The results are shown in Table 1.

Comparative Example 4

A heat dissipating polymer composition was produced in the same manner as in Comparative Example 1 except that 100 parts of a high-molecular-weight silicone rubber (number average molecular weight: 63,000, molecular weight distribution: 2.3) was used instead of the liquid-form butadiene rubber and in addition, 207 parts of the copper powder (manufactured by Sigma-Aldrich, Co. LLC, average particle size of 14 to 25 μm) was used instead of the silver powder. The heat dissipating polymer composition produced in Comparative Example 4 was agglomerated in a powder form, and thus it was not capable of being molded into a sheet form. Measurements and an evaluation were performed on the produced powder-form heat dissipating poly- Evaluation of Heat Dissipating Polymer Composition (Examples 1 to 4, Comparative Examples 1 to 4)

As shown in Table 1, a polyether polymer composition containing 200 parts or more of a metal-containing powder per a total of 100 parts of a cationic group-containing low molecular weight polyether polymer composed of 10 to 200 oxirane monomer units, wherein at least a part of the oxirane monomer units was an oxirane monomer unit having a cationic group, and a high molecular weight polyether polymer composed of more than 200 oxirane monomer units, was capable of being suitably processed into a sheet and also had high heat conductivity 5 days after the production which was excellent heat conductivity. Further, the heat conductivity was suitably maintained even after 2 months and in addition, dispersibility after storing for a long time was also good which was excellent stability in storing for a long time. For that reason, the polyether polymer composition was capable of being suitably used for a heat dissipating sheet application (Examples 1 to 4).

On the other hand, when the liquid-form butadiene rubber, the liquid-form silicone rubber, the styrene-butadiene rubber, and the silicone rubber were each used instead of the cationic group-containing low molecular weight polyether polymer and the high molecular weight polyether polymer, dispersibility of each polymer and the metal-containing powder was poor and none of them were capable of being molded into a sheet form. Further, the heat conductivity and the stability in storing for a long time were also poor (Comparative Examples 1 to 4).

Example 5

70 parts of the imidazolium structure-containing low molecular weight polyether polymer A produced in Production Example 1, 30 parts of the imidazolium structure-containing high molecular weight polyether polymer C produced in Production Example 3, and 900 parts of a silver powder (manufactured by Sigma-Aldrich, Co. LLC, average particle size of 5 to 8 μm) as a metal-containing powder were put into a Plasti-Corder Lab Station (W50EHT) manufactured by Brabender GmbH & Co. KG heated to 50° C., and subjected to shear mixing for 10 minutes at a speed of 50 rpm to obtain a rubber-like polymer composition. Next, the produced rubber-like polymer composition was placed in a mold of 30×30×0.5 mm and pressed at 120° C. and 5 MPa to produce a sheet-form electrically conductive polymer composition. Measurements and an evaluation of electrical conductivity and dispersibility after storing for a long time were performed on the produced sheet-form electrically conductive polymer composition in accordance with the above method. The results are shown in Table 2.

Example 6

A sheet-form electrically conductive polymer composition was produced in the same manner as in Example 5 except that 30 parts of high molecular weight polyether polymer B produced in Production Example 2 was used instead of 30 parts of imidazolium structure-containing high molecular weight polyether polymer C produced in Production Example 3. Measurements and an evaluation of electrical conductivity and dispersibility after storing for a long time were performed on the produced sheet-form electrically conductive polymer composition in accordance with the above method. The results are shown in Table 2.

[Evaluation of Electrically Conductive Polymer Composition (Examples 5, 6)]

As shown in Table 2, a polyether polymer composition containing 200 parts or more of a metal-containing powder per a total of 100 parts of a cationic group-containing low molecular weight polyether polymer composed of 10 to 200 oxirane monomer units, wherein at least a part of the oxirane monomer units was an oxirane monomer unit having a cationic group, and a high molecular weight polyether polymer composed of more than 200 oxirane monomer units, was capable of being suitably processed into a sheet and also had low surface resistance 5 days after the production which was excellent electrical conductivity. Further, the surface resistance was maintained at a low level even after 2 months, and in addition, dispersibility after storing for a long time was also good, and hence excellent stability in storing for a long time was shown. For that reason, the polyether polymer composition was capable of being suitably used for an application in an electrically conductive sheet (Examples 5, 6).

The invention claimed is:

1. A polyether polymer composition comprising 200 parts by weight or more of a metal-containing powder per a total of 100 parts by weight of a cationic group-containing low molecular weight polyether polymer composed of 10 to 200 oxirane monomer units, wherein at least a part of the oxirane monomer units is an oxirane monomer unit having a cationic group, and a high molecular weight polyether polymer composed of more than 200 oxirane monomer units,
wherein a ratio between the cationic group-containing low molecular weight polyether polymer and the high molecular weight polyether polymer is 70:30 to 33:67 in terms of a weight ratio of "cationic group-containing low molecular weight polyether polymer:high molecular weight polyether polymer".

2. The polyether polymer composition according to claim 1, wherein the metal-containing powder is at least one selected from a metal powder, a metal oxide powder, and a metal nitride powder.

3. The polyether polymer composition according to claim 1, wherein the metal-containing powder is a metal oxide powder and a metal powder.

4. The polyether polymer composition according to claim 1, wherein in the cationic group-containing low molecular weight polyether polymer, a proportion of the oxirane monomer unit having a cationic group is 5 mol % or more based

TABLE 2

| | | | Example 5 | Example 6 |
|---|---|---|---|---|
| Composition | Imidazolium structure-containing low molecular weight polyether polymer A | (parts) | 70 | 70 |
| | High molecular weight polyether polymer B | (parts) | — | 30 |
| | Imidazolium structure-containing high molecular weight polyether polymer C | (parts) | 30 | — |
| | Liquid-form butadiene rubber | (parts) | — | — |
| | Liquid-form silicone rubber | (parts) | — | — |
| | Styrene-butadiene rubber | (parts) | — | — |
| | Silicone rubber | (parts) | — | — |
| | Zinc oxide powder | (parts) | — | — |
| | Copper powder | (parts) | — | — |
| | Silver powder | (parts) | 900 | 900 |
| Initial form of sample | | | Sheet form | Sheet form |
| Surface resistance after 5 days | | (Ω/sq) | $7.3 \times 10^{-4}$ | $9.4 \times 10^{-4}$ |
| Surface resistance after 2 months | | (Ω/sq) | $7.9 \times 10^{-4}$ | $9.5 \times 10^{-4}$ |
| Dispersibility after storing for a long time | | | Very Good | Very Good | on all the oxirane monomer units of the cationic group-containing low molecular weight polyether polymer.

5. The polyether polymer composition according to claim 1, wherein the cationic group-containing low molecular weight polyether polymer comprises a monomer unit represented by the following general formula (1):

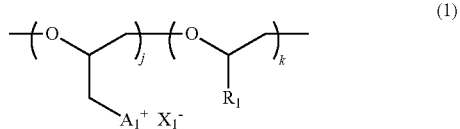
(1)

wherein $A_1^+$ represents a cationic group or a cationic group-containing group, $X_1^-$ represents any counter anion, $R_1$ represents a non-ionic group, j is an integer of 1 or more, k is an integer of 0 or more, and j and k satisfy $10 \leq j+k \leq 200$.

6. The polyether polymer composition according to claim 1, wherein at least a part of the oxirane monomer units contained in the high molecular weight polyether polymer is an oxirane monomer unit having a cationic group.

7. The polyether polymer composition according to claim 1, wherein the high molecular weight polyether polymer comprises a monomer unit represented by the following general formula (2):

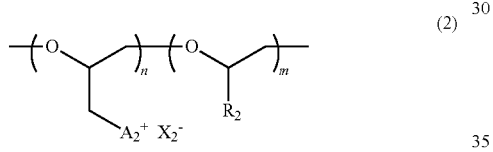
(2)

wherein $A_2^+$ represents a cationic group or a cationic group-containing group, $X_2^-$ represents any counter anion, $R_2$ represents a non-ionic group, n is an integer of 0 or more, m is an integer of 0 or more, and n and m satisfy $n+m>200$.

8. A sheet comprising the polyether polymer composition according to claim 1.

9. A method for producing a polyether polymer composition, the method comprising, while applying a shear force, mixing under substantially solvent-free conditions a cationic group-containing low molecular weight polyether polymer composed of 10 to 200 oxirane monomer units, wherein at least a part of the oxirane monomer units is an oxirane monomer unit having a cationic group, a high molecular weight polyether polymer composed of more than 200 oxirane monomer units, and a metal-containing powder, and wherein a use amount of the metal-containing powder is 200 parts by weight or more per a total of 100 parts by weight of the cationic group-containing low molecular weight polyether polymer and the high molecular weight polyether polymer, and wherein a ratio between the cationic group-containing low molecular weight polyether polymer and the high molecular weight polyether polymer is 70:30 to 33:67 in terms of a weight ratio of "cationic group-containing low molecular weight polyether polymer:high molecular weight polyether polymer".

* * * * *